United States Patent Office 3,847,992
Patented Nov. 12, 1974

3,847,992
PARTIALLY AMINATED POLYOXYALKYLENE POLYOLS
Philip Hotchkiss Moss, Austin, Tex., assignor to Jefferson Chemical Company, Inc., Houston, Tex.
No Drawing. Filed Mar. 12, 1973, Ser. No. 339,987
Int. Cl. C07c 89/00, 91/04
U.S. Cl. 260—584 B 6 Claims

ABSTRACT OF THE DISCLOSURE

Partially aminated polyoxyalkylene polyols having a functionality of from 2 to 8 and a hydroxyl number of about 20 to 60 are described. The partially aminated polyol has from about 15 to about 55 percent amine groups and from about 45 to about 85 percent primary hydroxyl groups. These materials are particularly useful in the manufacture of polyurethane materials.

Background of the Invention

Polyoxyalkylene polyols are manufactured by reacting a suitable initiator having from 2 to 8 hydroxyl groups with a sufficient amount of an alkylene oxide to a desired molecular weight. These polyols may be reacted with isocyanate-containing compounds to form polyurethane materials. Such polyoxyalkylene polyols are well known to those skilled in the art and are formed by reacting polyhydric compounds having 2 to 8 hydroxyl groups in the well known manner with 1,2-epoxides such as ethylene oxide, propylene oxide and higher alkylene oxides having as many as 18 carbon atoms. The higher epoxides can be either straight chain or branched chain epoxides wherein the carbon atoms are present as alkyl radicals. Representative polyether polyols are described, for example, in U.S. Pat. 3,194,733 and polyether polyols useful in the practice of my invention are formed where the polyether polyol is produced by reacting the suitable initiator with propylene oxide or a higher alkylene oxide followed by a "capping" by reaction with ethylene oxide, thus providing a polyether polyol which has both primary and secondary terminal hydroxyl groups. Particularly useful polyether polyols are prepared in accordance with U.S. Pat. 3,535,307 wherein the initiator is reacted with a higher alkylene oxide and then sequentially reacted with ethylene oxide followed by another reaction with the higher alkylene oxide to form a blocked polyether polyol. This blocked polyether polyol can also then be reacted with ethylene oxide to incerase the primary hydroxyl content of the resulting polyol.

Polyether triols which have been aminated from 60 to 100 percent, having molecular weight of from 300 to 1700, are described in British patent 1,188,415 for use as curing agents for epoxy resins. U.S. Pat. 3,654,370 also describes a process for preparing fully aminated polyols. However, when used for the production of polyurethane foams, these materials have such high reaction rates that satisfactory polyurethane foams cannot be produced. The reaction occurs either so fast that foaming does not take place and a solid mass results or, if the foaming does occur, the foam shrinks badly after production. Foams prepared using even polyether polyols capped with ethylene oxide to provide primary hydroxyl groups do not cure fast enough to be wholly desirable.

Accordingly, it is an object of my invention to provide a partially aminated polyoxyalkylene polyol which can be widely used in the production of polymers. In short, it is the special object of my invention to provide a material for reaction with polyisocyanates which has a reaction time, known to those skilled in the art as cream time, comparable to that of the ethylene oxide capped polyether polyols but which has an improved cure time.

Summary of the Invention

Polyoxyalkylene polyols having 45 to about 85 percent primary hydroxyl groups and a hydroxyl number from about 20 to about 60 are partially aminated such that the resulting polyether has from about 15 to about 55 percent terminal amine groups. The aminated polyether material will contain primary hydroxyl groups, amine groups and, in some instances, secondary hydroxyl groups in the terminal position.

The initiators useful in the practice of my invention are those generally described in the aforementioned patents and have heretofore been known useful precursors for polyoxyalkylene polyols. The oxyalkylene groups result from the reaction of $C_2$ to $C_{18}$ epoxides, either alone or in blocked or heteric mixtures thereof. The polyoxyalkylene polyols are capped with the reaction of sufficient ethylene oxide, usually from 10 to 15 weight percent of the entire polyol, to provide from about 45 to about 85 percent primary hydroxyl termination to the material.

The polyoxyalkylene polyol, thus capped by reaction with ethylene oxide having a functionality of from 2 to about 8 and a hydroxyl number of about 20 to about 60, is reacted with ammonia in the presence of a hydrogenation-dehydrogenation catalyst at elevated temperatures and pressures, often in the presence of hydrogen, to produce the partially aminated material which is the subject matter of my invention.

These partially aminated materials are particularly useful in the production of polyurethane foam wherein the reaction time is comparable to that resulting from the use of an ethylene oxide capped polyether polyol but yet the cure time (gel time) is somewhat faster.

Surprisingly, also it has been discovered that the materials of my invention also produce a thixotropic mixture in combination with inorganic fillers and pigments. This property allows the production of a thixotropic component for reaction with organic polyisocyanates to produce polyurethane elastomers. This is particularly advantageous in the production of carpet backing and joint sealants.

Description of the Preferred Embodiment

The partially aminated polyoxyalkylene compounds of my invention contain from about 15 to about 55 percent amine groups in the terminal positions and from about 45 to about 85 percent primary hydroxyl groups. These compounds are prepared by reacting polyoxyalkylene polyols having about 45 to about 85 percent primary hydroxyl groups, a functionality of from 2 to about 8 and a hydroxyl number of about 20 to about 60 with ammonia over a hydrogenation-dehydrogenation catalyst at elevated temperatures and pressures in the presence of hydrogen. The trifunctional material is an especially preferred embodiment of my invention.

In the broadest sense, the polyoxyalkylene polyol results from the addition of an alkylene oxide to an initiator, having 2 to 8 hydroxyl groups, using well known oxyalkylation procedures. A quantity of said alkylene oxide is added to achieve the desired molecular weight. The hydroxyl number, as determined by the well known KOH titration, can be used to readily calculate the molecular weight using the following well known formula:

$$MW = \frac{\text{Functionality} \times 1000 \times 56.1}{\text{OH No.}}$$

As to the initiators useful to produce polyether polyols which are useful in the practice of my invention, many such initiators are described in U.S. patent 3,535,307, for example, and include polyhydric alcohols such as ethylene glycol, propylene glycol, trimethylolpropane, glycerol, sorbitol, sucrose, methylglucoside, 1,2,6-hexanetriol, erythritol and pentaerythritol, for example. Especially preferred starting materials for the practice of my invention are those polyether polyols which are produced from glycerol or trimethylolpropane.

The alkylene oxides useful to prepare the polyether polyols useful for the practice of my invention are those having from 2 to 18 carbon atoms but particularly ethylene oxide, propylene oxide, butylene oxide and mixtures thereof. These alkylene oxides can be added to the initiator in either a heteric or blocked manner using processes well known to those skilled in the art. The last oxide addition will be ethylene oxide, of course, to provide the necessary primary hydroxyl termination. See, for example, U.S. Pat. 3,000,963. U.S. Pat. 3,535,307 describes a high molecular weight polyether blocked polyol particularly useful for the practice of my invention.

The especially preferred embodiment of my invention involves the partially aminated triols having the above-mentioned hydroxyl number which are "capped" by the addition of ethylene oxide in a last step in producing said polyol to primary hydroxyl termination of about 45 to 85 percent. This is accomplished as also described in U.S. Pat. 3,535,307 and is well known to those skilled in the art. When these triols are partially aminated, the resulting product has about 15 to 55 percent terminal amino groups and about 45 to 85 percent primary hydroxyl groups. While substantially all the terminal hydroxyl groups are primary hydroxyl groups, some secondary hydroxyl groups may still be present. These materials have been found to be particularly useful in the production of flexible polyurethane foams giving a good quality foam with improved gel time and as a component in the production of filled polyurethane elastines since the use of these materials impart a thixotropic property to the component.

The above-described polyoxyalkylene polyols are reacted with ammonia in the presence of a hydrogenation-dehydrogenation catalyst at elevated temperatures and pressures in the presence of hydrogen to form the partially aminated polyols of my invention. Suitable reactors include either a closed autoclave resulting in a batch process or a tubular reactor which can be operated in a continuous manner. Either is suitable for the practice of my invention.

This class of catalysts is well known and includes one or more of the metals including copper, nickel, cobalt, chromium, aluminum, manganese, platinum, paladium and rhodium and the oxides of these metals. The metals or their oxides may be employed in combination with normally nonreducible metal oxides such as chromium oxide, molybdenum oxide and manganese oxide. The amount of the nonreducible oxide employed may be varied considerably and some catalysts, notably those based upon cobalt, require the presence of no nonreducible metal oxides.

One preferred catalyst that is very effective for the amination reaction, includes the metals or oxides of copper, nickel, cobalt and chromium. A particularly satisfactory catalyst is one in which the active ingredients consist essentially, in mol percent on an oxide-free basis, of 60 to 85 percent nickel, 14 to 37 percent copper and 1 to 5 percent chromium and produced in accordance with the procedure described in U.S. Pat. 3,152,998. As used herein, this catalyst will be referred to as a nickel-copper-chromia catalyst and is used most often in its pelleted form but is also satisfactory when crushed and powdered. Other preferred catalysts are the readily available metallic cobalt hydrogenation-dehydrogenation catalysts.

The reaction is carried out from 160° to 250° C. The reaction pressures are from 750 to about 4000 p.s.i.g. with a hydrogen partial pressure of at least about 200 p.s.i.g. The preferred pressure range is from about 1000 to about 2500 p.s.i.g. and a hydrogen partial pressure of from about 200 to about 2000 p.s.i.g. Surprisingly, within these ranges the degree of amination occurring is relatively insensitive to variation of temperature and pressure and the degree of amination is determined by the residence time (i.e., space velocity) in the reactor.

The residence time in the reactor to be used to produce the partially aminated polyols of my invention are those which would occur at space velocities of about 0.2 to about 3.0 volume of reactants per volume of catalyst per hour with the preferred space velocity being from about 1.0 to about 2.0. The space velocity herein discussed is in cm.$^3$/volume of catalyst (1000 cm.$^3$)/hour but rates in equivalent units are equally applicable.

The ratio of reactants, i.e., polyether polyols and the ammonia can vary over a wide range to produce the aminated polyol of my invention. The weight feed rate of the polyol usually expressed herein as pounds per hour, can vary from half of the ammonia feed rate to about 10 times the ammonia feed rate without deleteriously effecting the conversion of the hydroxyl groups to amino groups.

As stated hereinbefore, this reaction can be performed in either batch or continuous manner. In Examples I through III, following, a tubular continuous reactor 59.5 inches long and 1.25 inches internal diameter was used and charged with 1000 ml. of catalyst. It was equipped with separate connections at the entrance end for the polyol, ammonia and nitrogen/hydrogen gas mix.

The above-described invention is more particularly set forth in the following examples which are to be construed for purposes of illustration only and not for limitation of my invention. Obvious modifications from the following examples can be made to accommodate various feedstocks based upon the description in the foregoing discussion.

EXAMPLE I

A polyoxypropylene triol capped with ethylene oxide to give 65% primary and 35% secondary hydroxyl groups, hydroxyl number about 25.5, was pumped at a rate of 1.70 pounds per hour through the fixed bed catalytic reactor as described above containing 1000 ml. of the nickel-copper-chromia catalyst having 75 mol percent nickel, 23 mol percent copper and 2 mol percent chromium. The second reactant feed was anhydrous ammonia, introduced at a 0.20 pound per hour rate. A 75% hydrogen-25% nitrogen (mol ratio) gas was passed through the reactor at a rate of 160 liters per hour (standard temperature and pressure). Conditions were 1000 p.s.i.g. and 194° to 198° C. for the 5.5 hour run. The product, which contained traces of catalyst fines, was filtered through a filter aid and then stripped free of ammonia and water at final conditions of 110° C. and 2 mm. Hg total pressure. A light-colored, clear, viscous liquid weighing 3500 g. was recovered. Titration of a sample of the product in isopropanol solution with 0.1993 N hydrochloric acid showed that 23% of the hydroxyls had been converted to amino groups. By Kjeldahl analysis, nitrogen content was 0.14%, total acetylatables 0.375 meq./gram.

EXAMPLE II

A polyoxypropylene triol of 25 hydroxyl number and 50% primary hydroxyl-50% secondary hydroxyl content (after capping with ethylene oxide) was pumped through the above-described catalytic reactor as described in Example I at 1.70 pounds per hour. Also fed into the reactor was 1.70 pounds per hour of anhydrous ammonia. The catalyst was Versacat 12-1, a pelleted, prereduced cobalt material. The reaction was continued for two hours at 215° C. and 1000 p.s.i.g. Ammonia and water were stripped at 100° C./2 mm. Hg and the product filtered to remove a small amount of catalyst fines. Analysis of the product by titration with standardized HCl showed that 28% of the hydroxyl groups were converted to amino groups. Total acetylatables were 0.39 milliequivalent per gram, total amines 0.13 and secondary plus tertiary amines 0.02 meq./gram.

EXAMPLE III

A capped polyether triol made by reacting ethylene oxide with a polyoxypropylene triol had 65% primary and 35% secondary hydroxyls with a hydroxyl number of 33.4. It was aminated by passing 0.85 pound of ammonia and 0.85 pound of the triol over 100 ml. of nickel-copper-chromia catalyst (Example I) per hour at 205° C. and 1000 p.s.i.g. A 25% nitrogen-75% hydrogen gas stream was passed in at 160 liters per hour. In about three hours, 1124 g. of colorless product was collected. It was vacuum stripped at about 115° C. and 3 mm. pressure to give an amino alcohol which, by titration, contained 30.3% amino groups and the unconverted hydroxyl groups about 70%, about 5% of which are secondary hydroxyls.

EXAMPLE IV

A diol was prepared by capping a polypropylene glycol with ethylene oxide to give a diol of hydroxyl number 27.8 and primary/secondary hydroxyl ratio 60/40. To a one liter autoclave was charged 205 g. of this diol and 45 g. of powdered prereduced nickel-copper-chromia catalyst having the percentage composition as in Example I. After the air had been purged from the vessel with hydrogen, 100 g. of anhydrous ammonia was pressured in, followed by 300 p.s.i.g. of hydrogen. The reaction was carried out at 205° C. for one hour at 1600 p.s.i.g. Product was filtered to remove catalyst and volatiles were stripped at 110° C., 3 mm. Hg to give a viscous fluid. By titration, 46.5% of the hydroxyl groups had been replaced by amino groups.

EXAMPLE V

The following table illustrates the foregoing discussion with respect to the effect of reaction conditions on the degree of amination. A polyether triol having a molecular weight of approximately 4500 (OH no. about 37) having about 75% primary hydroxyl groups was aminated as described in Example I at a pressure of 1000 p.s.i.g. in each run.

| Run | Temp., °C. | Feed rate lb./hr. Polyol | Feed rate lb./hr. NH₃ | Space velocity* | Percent amination |
|---|---|---|---|---|---|
| 1 | 195 | 1.70 | 1.70 | 2.0 | 17 |
| 2 | 205 | 1.70 | 1.70 | 2.0 | 19 |
| 3 | 215 | 1.70 | 1.70 | 2.0 | 19 |
| 4 | 195 | 0.85 | 0.85 | 1.0 | 30 |
| 5 | 205 | 0.85 | 0.85 | 1.0 | 30 |

*Cm.³/volume of catalyst/hr.

EXAMPLE VI

A polyether triol as described in Example I was charged to a one liter autoclave (200 g.) together with 45 g. of powdered nickel-copper-chromia catalyst as in Example IV. After air was purged from the vessel with hydrogen, 100 g. of anhydrous ammonia was introduced followed by 300 p.s.i.g. of hydrogen. The reaction took place at 205° C. and 1800 p.s.i.g. Filtration of the product followed by striping of volatilies at 110° C./3 mm. Hg gave a viscous liquid which showed by titration that 40% of the hydroxyl groups had been replaced by amino groups.

EXAMPLE VII

A flexible polyurethane foam was prepared by reacting the aminated polyol prepared according to Example I with a polymeric MDI-type isocyanate, functionality 2.2. The resulting foams produced had a faster cure rate when the partially aminated polyol was used as compared to the foam derived from the corresponding nonamino polyol. Formulation and processing details are shown in the following table:

| Foam | A | B |
|---|---|---|
| Aminated 6,500 M.W. polyol, 23% amination (Example I) | 100 | |
| Corresponding nonaminated 6,500 M.W. polyol (Feed Example I) | | 100 |
| Water | 3.0 | 3.0 |
| Dabco® 33LV* | 0.75 | 0.75 |
| Thanate® P-220** | 52.5 | 52.5 |
| NCO/OH index | 1.05 | 1.05 |
| Details of preparation: | | |
| Cream time, sec | 15 | 15 |
| Rise time, sec | 300 | 300 |
| Gel time, sec | 450 | 480 |

*Houdry trademark for triethylenediamine.
**Jefferson trademark for its polymethylenpolyphenylpolyisocyanate having a functionality of 2.2.

From the foregoing description and examples, one skilled in the art can make obvious modifications to this invention without deviating from the scope and spirit thereof as embodied in the following claims.

I claim:

1. A partially aminated polyoxyalkylene polyol having a functionality of from 2 to 8 and a hydroxyl number of about 20 to about 60 wherein the reactive groups of said partially aminated polyol comprise from about 15 percent to about 55 percent amine groups and from about 45 percent to about 85 percent primary hydroxyl groups.

2. The partially aminated polyoxyalkylene polyol of Claim 1 wherein the polyoxyalkylene polyol is a diol or a triol.

3. The partially aminated polyoxyalkylene polyol of Claim 2 wherein the polyoxyalkylene polyol is a triol.

4. A continuous method for preparing a partially aminated polyoxyalkylene polyol wherein the degree of amination is controlled between about 15 percent and about 55 percent which comprises:
   (a) reacting in a tubular reactor in the presence of a hydrogenation-dehydrogenation catalyst a polyoxyalkylene polyol with ammonia at about 160° C. to about 250° C. and 750 to 4000 p.s.i.g. in the presence of at least 200 p.s.i.g. hydrogen partial pressure wherein the degree of amination is determined by selecting a space velocity of from about 0.2 to about 3.0 volumes of reactants per volume of catalyst per hour; wherein the polyoxyalkylene polyol has a functionality of from 2 to 8 and a hydroxyl number of about 20 to about 60 and from about 45 percent to about 85 percent primary hydroxyl groups; and wherein said polyoxyalkylene polyol and ammonia are reacted at a weight ratio of from 0.5:1 to 10:1 of said polyol to the ammonia; and
   (b) recovering the partially aminated polyoxyalkylene polyol having from about 15 percent to about 55 percent terminal amine groups.

5. The method of Claim 4 which the temperature is from about 180° C. to about 220° C., the pressure is from about 1000 p.s.i.g. to about 2500 p.s.i.g. and the space velocity is from about 1.0 to about 2.0.

6. The method of Claim 5 wherein the polyoxyalkylene polyol is a diol or a triol.

References Cited

UNITED STATES PATENTS

| 3,654,370 | 4/1972 | Yeakey | 260—585 B |
| 3,390,184 | 6/1968 | Moss et al. | 260—585 B |
| 3,352,916 | 11/1967 | Zech | 260—585 B |

FOREIGN PATENTS

| 1,188,415 | 4/1970 | Great Britain | 260—584 B |

LEWIS GOTTS, Primary Examiner

D. R. PHILLIPS, Assistant Examiner

U.S. Cl. X.R.

260—2.5 AQ, 77.5 AQ, 585 B